United States Patent
Hoppe et al.

(10) Patent No.: US 7,889,275 B2
(45) Date of Patent: Feb. 15, 2011

(54) SYSTEM AND METHOD FOR CONTINUOUS FLASH

(75) Inventors: Hugues Herve Hoppe, Redmond, WA (US); Kentaro Toyama, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 1493 days.

(21) Appl. No.: 10/353,368

(22) Filed: Jan. 28, 2003

(65) Prior Publication Data

US 2004/0145674 A1 Jul. 29, 2004

(51) Int. Cl.
*H04N 5/222* (2006.01)
(52) U.S. Cl. ............... 348/370; 348/229.1; 348/371
(58) Field of Classification Search ............. 348/370, 348/371, 229.1
See application file for complete search history.

(56) References Cited

U.S. PATENT DOCUMENTS

| | | | | |
|---|---|---|---|---|
| 5,309,243 A * | 5/1994 | Tsai | ............ | 348/221.1 |
| 6,535,245 B1 * | 3/2003 | Yamamoto | ............ | 348/223.1 |
| 6,906,751 B1 * | 6/2005 | Norita et al. | ............ | 348/349 |
| 7,002,624 B1 * | 2/2006 | Uchino et al. | ............ | 348/225.1 |
| 7,199,831 B2 * | 4/2007 | Nonaka | ............ | 348/370 |
| 2002/0012053 A1 * | 1/2002 | Yoshida | ............ | 348/243 |
| 2002/0190229 A1 * | 12/2002 | Nakamura et al. | ............ | 250/556 |
| 2004/0201759 A1 * | 10/2004 | Horiuchi | ............ | 348/254 |
| 2006/0033835 A1 * | 2/2006 | Pollard et al. | ............ | 348/370 |

FOREIGN PATENT DOCUMENTS

JP     02-280585 A   * 11/1990

* cited by examiner

*Primary Examiner*—Tuan Ho
*Assistant Examiner*—Anthony J Daniels
(74) *Attorney, Agent, or Firm*—Lyon & Harr, LLP; Katrina A. Lyon

(57) ABSTRACT

A photo illumination technology that facilitates user selectable illumination of an existing photo ranging from full artificial flash illumination to ambient light illumination and every gradation between. The technology in one embodiment employs a digital camera feature that captures two photos hundredths of a second apart where one photo is captured in concert with a flash and one is captured with no flash. Compensations are made to reconcile any movement of the subject matter that may have occurred between the two photos and the user is presented with the infinite gradations of illumination on the subject matter when selecting a photo for display or printing.

50 Claims, 6 Drawing Sheets
(3 of 6 Drawing Sheet(s) Filed in Color)

Picture $I_0=I(0.0)$ without flash

Picture $I_1=I(1.0)$ with flash

I(-1.0)

I(0.3)

I(0.5)

I(0.7)

I(1.4)

I(2.0)

SYSTEM AND METHOD FOR CONTINUOUS FLASH

BACKGROUND

1. Technical Field

This invention is directed toward a system and method for improving digital images. More specifically, the invention is directed towards a photo illumination technology that facilitates user-selectable illumination of an existing photo ranging from full artificial flash illumination to ambient light illumination and every gradation between.

2. Background Art

Recently, some efforts have been made to do things with digital photography that are difficult or impossible with analog photography. Many digital cameras now come with a capacity to shoot short video clips. Some digital camera software comes equipped with image-stitching capabilities that allow one to create larger panoramas sewn together from smaller, overlapping images of the same scene. However, none of these digital photography techniques can be used to vary the amount of flash after the picture is taken to obtain the optimum illumination level for the subject matter to be photographed.

A flash typically allows the photographer to control the lighting situation when the picture is taken. If insufficient natural light is available, a flash may be used to increase the overall illumination. Sometimes the subject matter to be photographed is too dimly illuminated to make a photograph without supplementary lighting. Additionally, flash may be used in order to change or improve the natural lighting. This is known as fill flash. For instance, pictures taken of people outside on a bright day often show the subjects squinting due to the glare caused by the sun. A good solution to this problem is to move the subjects into the shade and to use flash to fill in the shadows.

Either with a digital or with an analog camera, obtaining the correct amount of flash is difficult. Often images photographed are overexposed—too much light reached the film when the picture was taken. There are many reasons that this occurs. The flash could have been too bright or the flash setting was in some other way improper. The shutter speed could have been too slow or the aperture could have been too large. Alternately, the images could be underexposed—that is, not enough light reached the film, and the picture comes out dark and indistinguishable. In this case, film speed, shutter speed, aperture and flash settings can all have an effect. With so many variables it is difficult for even the most experienced photographer to obtain a photograph with the proper amount of flash.

SUMMARY

The present invention is directed toward a system and method of varying an image's or photograph's illumination. This system and method, named the continuous flash system and method, facilitates user-selectable illumination of a photograph or other image ranging from full artificial flash illumination to ambient light illumination and every gradation between, based on a set of initially acquired images of identical or similar subject matter. Additionally, it is even possible to extrapolate beyond the initially acquired images to achieve other illumination effects. One embodiment of the continuous flash system and method employs a digital camera feature that captures two photos hundredths of a second apart where one photo is captured in concert with a flash and one is captured with no flash. In general, the continuous flash system and method then interpolates or extrapolates between or beyond the set of initially acquired images to obtain a final image with the preferred amount of flash. One embodiment of the invention incorporates this interpolation and extrapolation of the amount of flash intensity within the software or firmware of a digital camera. Compensations may be made to reconcile any movement of the subject matter that may have occurred between the set of originally acquired images. A user may be presented with the infinite continuum of gradations of illumination when determining the amount of illumination desired for the final image. Or the system may automatically render the final image based on some predetermined or prescribed illumination value.

More specifically, the continuous flash-system and method acquires and stores an image set, typically composed of two images, with a camera. Typically, these images will depict the same static scene. One picture is taken without flash and the other picture is taken with a flash. It should be noted that if the originally acquired image set includes more than one image with flash (while still retaining the image taken at ambient light conditions) better interpolation/extrapolation results can be obtained. These pictures in the image set ideally should be acquired in a short time interval, so that there is little motion of the camera and the subject matter of the image between the images of the set. However, if the subject matter to be photographed, as well as the camera position, are static over long periods of time then it does not matter how much time has elapsed. Potentially, a tripod can be used to hold the camera steady between the exposures. If there is misalignment between the initially acquired images they can be aligned using conventional image alignment methods.

Once the initial set of images is acquired, and optionally aligned, the system interpolates and/or extrapolates the amount of flash. In such a case, additional images are generated. Essentially, in the case of interpolation, image processing is employed to interpolate the flash intensity between input images to generate an image or images having flash intensity value(s) in-between those of the input image set. Whereas, in the case of extrapolation, extrapolation techniques are used to extrapolate the flash intensity to generate images having a flash intensity outside those of the input image set. The resulting images are referred to as flash adjusted images. One or more of these flash adjusted images can be selected as a final image, the image with the preferred amount of flash. Any of the initially acquired, flash adjusted or final images can be stored, displayed or printed.

In one working embodiment simple linear interpolation in red, green, blue (RGB) space was used. However, one could also interpolate in other color models, such as HSV (hue, saturation, value) or HLS (hue, lightness, saturation). The system and method according to the invention works with grayscale images as well as color. In addition to different types of color space, other types of interpolation besides simple linear interpolation can be used. These include bilinear interpolation, spline-based interpolation, curve fitting, and regression. Additional methods of extrapolation could also be used to extrapolate the amount of illumination beyond that available in the set of originally acquired images.

A user-interface may be presented to the user that interpolates (and extrapolates) between these two stored images, to allow the user to vary the amount of flash. This user interface typically includes a slider control that allows the user to display one or more flash adjusted images with different levels of intensity before selecting the preferred intensity with which to display or render the final image. In one embodiment of the continuous flash system and method, the user interface includes three sliders to vary the red, green and blue intensity in the flash adjusted image or images separately before selecting the final image.

As mentioned above, since the two source images are not acquired at the exact same time, there may be motion of the camera from one image to the other. This motion can be compensated for by registering the two images together. This registration or alignment problem is well known in computer vision. The one big difference in the continuous flash system and method is that the images of the initially acquired image set have different intensity values, since one is taken with flash and the other without. Thus, the registration algorithm that is employed should be robust to intensity differences. For instance, one can apply a Gaussian or Laplacian filter to both images to locate high-derivative regions of the image, and align these derivative images together. For additional robustness, the alignment cost metric could look at just the signs of the derivatives and ignore their magnitudes. Alternately a camera tripod could be used to avoid registration when still images are taken.

Although typically the system and method according to the invention corrects the intensity of the whole image, in one embodiment only a portion of the image is corrected to obtain the optimum or preferred intensity level. In this case the portion of the image to be flash adjusted is segmented out and the flash intensity is only adjusted for the desired portion of the image.

In one working embodiment of the invention, the source images were captured with automatic exposure settings by the digital camera. It would be preferable for the two source images to be taken with identical exposure settings. Or, at least it would be preferable to know the F-stop difference between the two exposures, so that image values from both exposures can be brought into a common luminance coordinate system prior to interpolation.

The continuous flash system and method has many advantages. For instance, it allows even a novice photographer to obtain photographs with the optimum level of flash. Additionally, the initial image set can be easily stored within a camera or other storage device and flash adjustment can be performed at a much later time after acquiring the initial image set. Because the images of the image set are so much alike, especially after alignment, compressing them together results in a representation that does not require much more space than storing just one image alone. For example, a mean image can be compressed and then differences images can be compressed, resulting in a very low storage cost.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
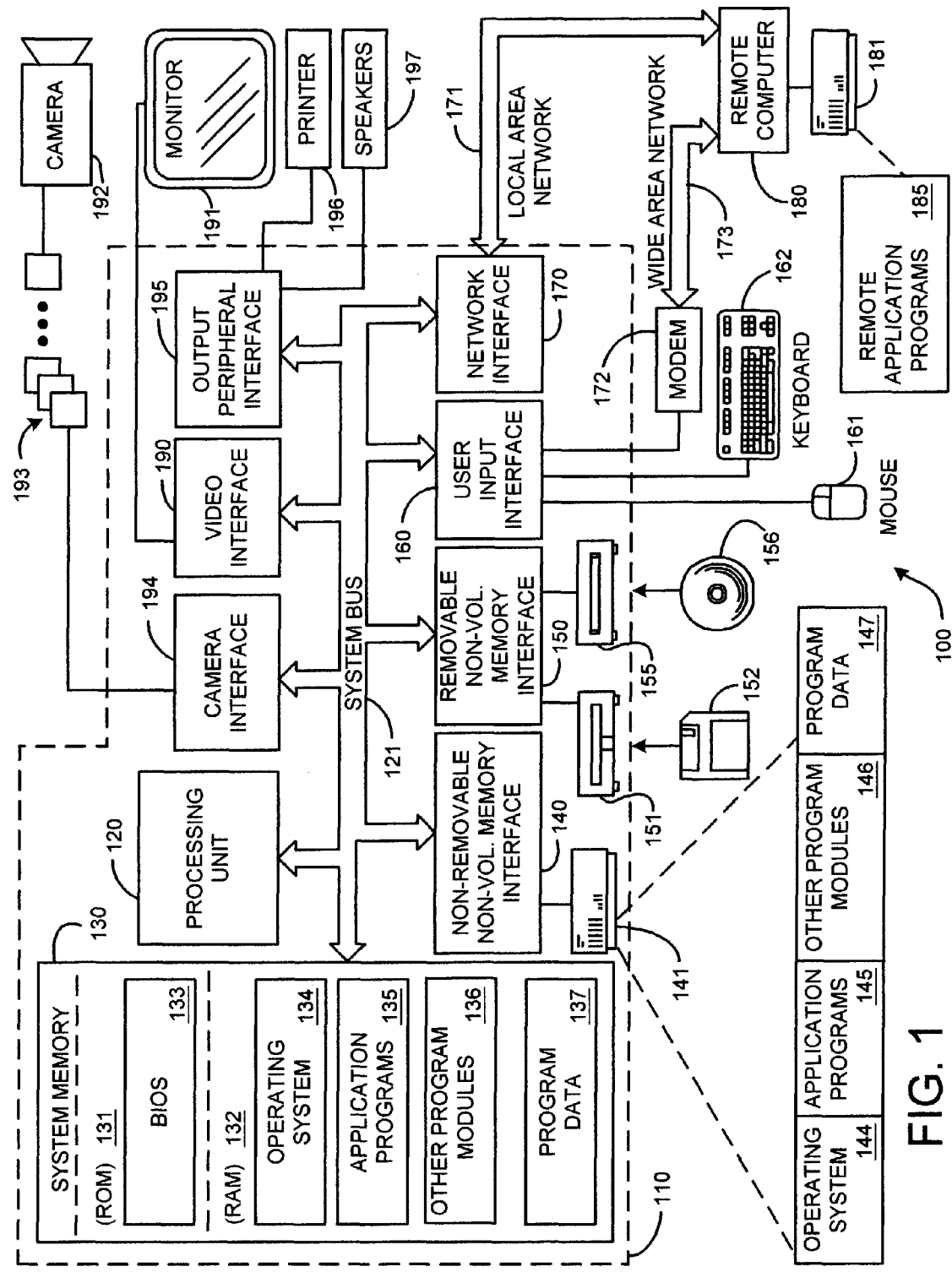
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (FCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Continuous Flash System and Method.

In the following paragraphs the continuous flash system and method which provides gradation of flash in flash adjusted images, is described in more detail.

2.1 General Overview.

The continuous flash system and method is directed toward a digital photo illumination technology that facilitates user-selectable illumination of an existing photo ranging from full artificial flash illumination to ambient light illumination and, if desired, every gradation between.

Figure 2:
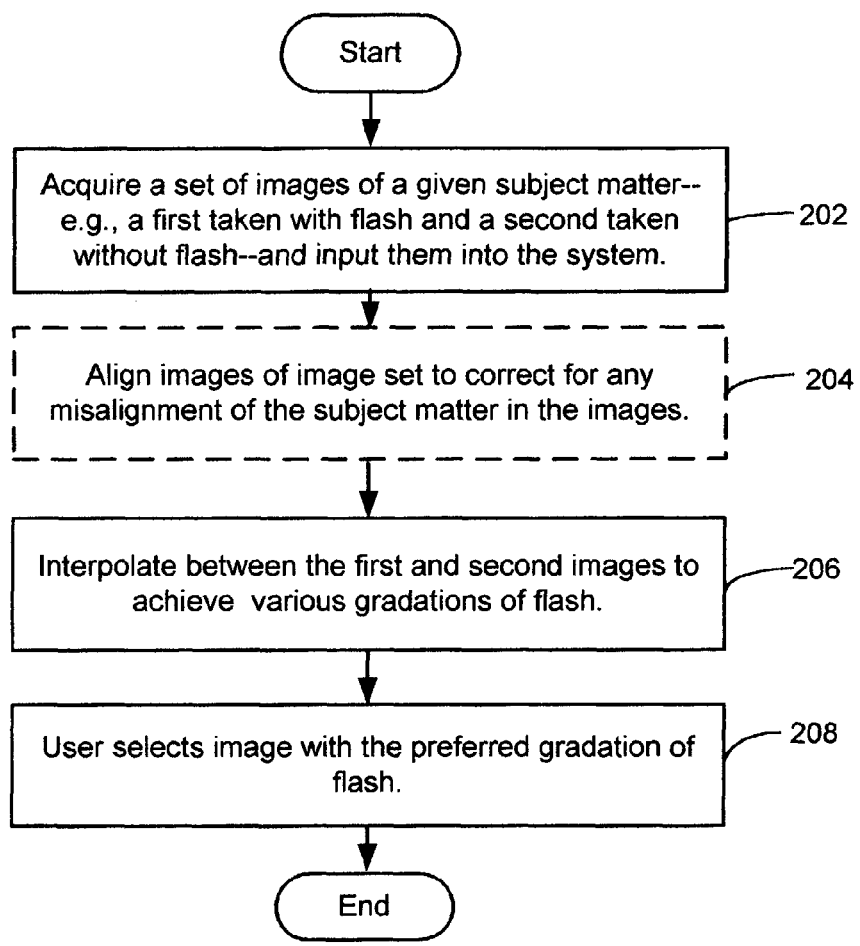
FIG. 2 is a general flow diagram of the system and method of interpolating between a set of images to achieve the desired level of illumination in an image.

As shown in FIG. 2, process action 202, the system and method according to the invention involves acquiring and storing an image set, typically containing two images, with a camera. In the two-image image set one picture is taken without flash and the other picture is taken with a flash. These two pictures should ideally be acquired in a short time interval, so that there is little motion between the subject matter of the images. Potentially, a tripod can be used to hold the camera steady between the two exposures, thus avoiding any movement between the images. If there is camera movement when taking the initial images, or the subject matter moves between the two photographs, the two images can be optionally aligned via conventional alignment methods, as shown in process action 204.

The system then interpolates between (or extrapolates from) the two acquired (and optionally aligned) images to achieve flash-adjusted images with various gradations of flash. In such a case, additional images are generated. Essentially, in the case of interpolation, image processing is employed to interpolate the flash intensity between input images to generate an image or images having flash intensity value(s) in-between those of the input image set. Whereas, in the case of extrapolation, extrapolation techniques are used to extrapolate the flash intensity to generate images having a flash intensity outside those of the input image set. The resulting images are referred to as flash adjusted images. One or more of these flash adjusted images can be selected as a final image, an image with the preferred amount of flash.

The system can allow the user to select the interpolated image with the preferred amount of illumination with which to render the final image. Alternately, the system can automatically render the final image based on some prescribed flash intensity value (process action 208) or it can automatically select the optimal flash intensity value incorporating the output of any machine-learning algorithm which has been trained on sets of images which serve as examples of "good" and "bad" levels of flash. Any of the initially acquired, flash adjusted or final images can be stored, displayed or printed.

Figure 3:
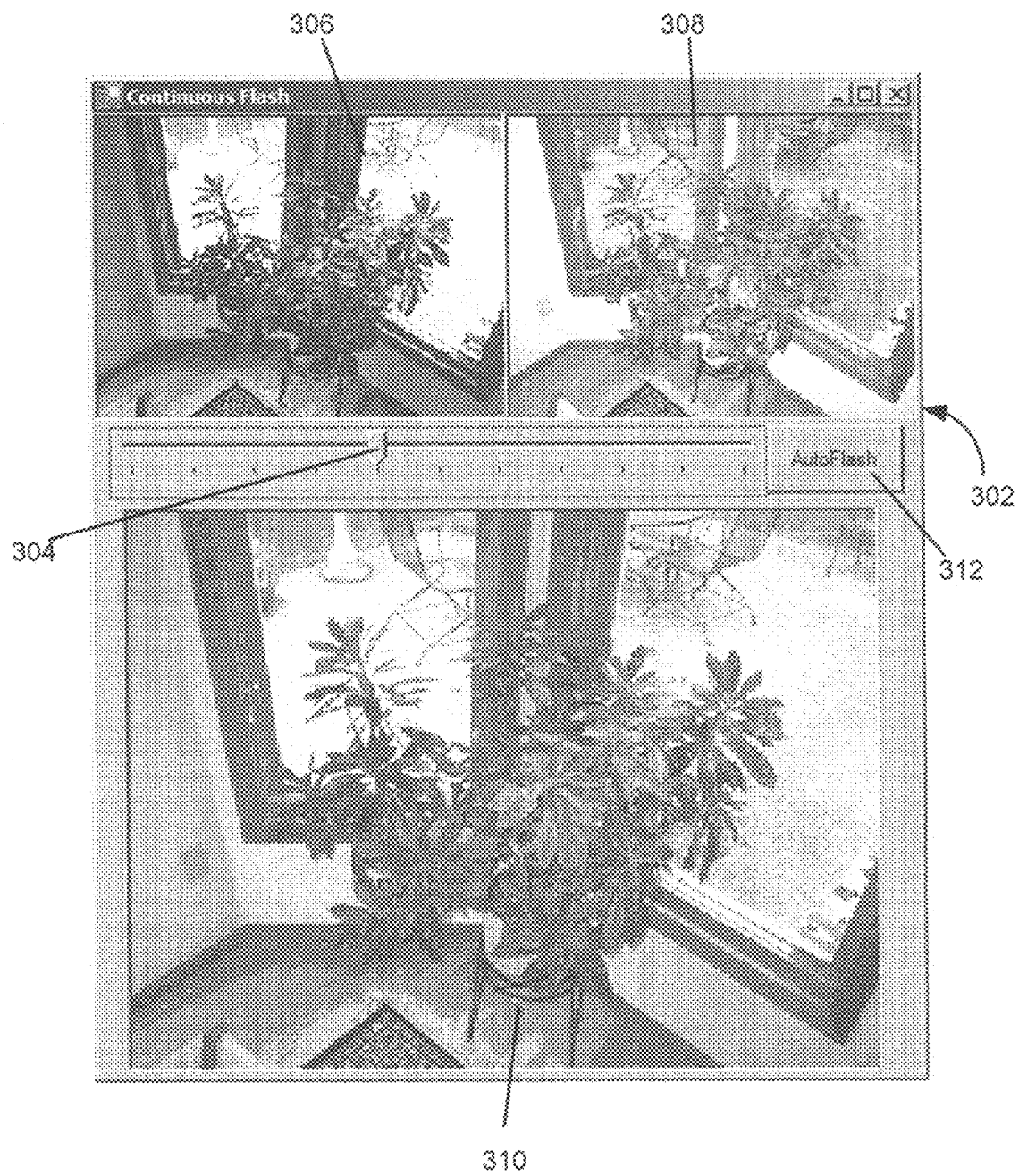
FIG. 3 is an exemplary User Interface of the continuous flash system and method.

As discussed above, a user-interface may be presented to the user that depicts the interpolated images available from the original set of acquired images, to allow the user to vary the amount of flash. Such a user interface typically employs a slider to vary the amount of illumination or flash in the flash-adjusted image or images to be rendered. The user can then direct the system to render the final image with the preferred amount of flash intensity. Alternately, instead of using one slider to vary overall flash intensity, one embodiment of the invention employs three sliders to vary the red, green and blue intensities separately. FIG. 3 shows an exemplary User Interface 302 wherein one slider 304 is used to vary flash intensity. The images of the initial image set (two images in this case) are shown to the top of the interface 306, 308. The flash adjusted image 310 is shown below. Button 312 allows the user to have the system calculate the flash intensity based either on a prescribed flash intensity value or an optimum value that is calculated by the system using the output of any conventional machine-learning algorithm which has been trained on sets of images which serve as examples of "good" and "bad" levels of flash.

Figure 4:
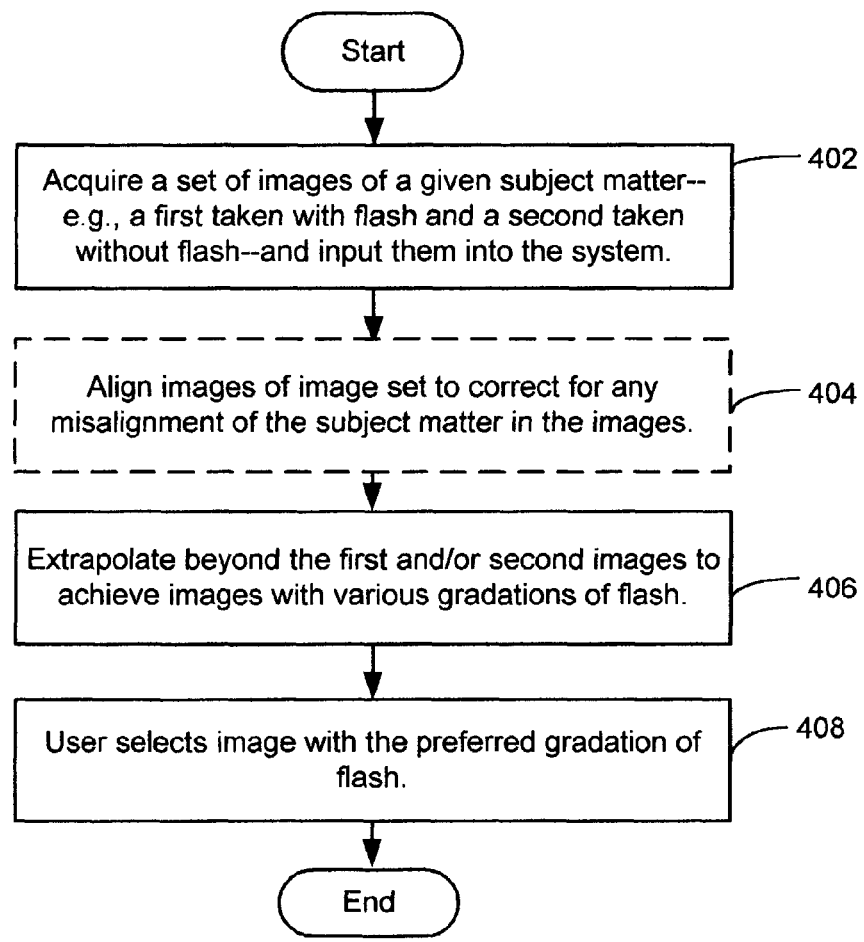
FIG. 4 is a general flow diagram of the system and method of extrapolating between a set of images to achieve the desired level of illumination in an image.

Similar to the process shown in FIG. 2, the continuous flash system and method can also employ extrapolation to obtain the desired illumination levels in an image to be rendered. As shown in FIG. 4, process action 402, two images of the two-image image set are acquired and stored—again, one picture is taken without flash and the other picture is taken with a flash. If there is camera movement when taking the initial images, or the subject matter moves between the two photographs, the two images can again be optionally aligned via conventional alignment methods, as shown in process action 404. Subsequently, the system extrapolates from the two acquired (and optionally aligned) images to achieve images with various gradations of flash. The system can allow the user to select the extrapolated image with the preferred amount of illumination with which to render the final image (process action 408). Again, a user-interface may be presented to the user for this purpose. Alternately, the system can automatically render an image with a prescribed amount of illumination or flash.

It should be noted that if the originally acquired image set includes more than one image with flash with different levels of flash (while still retaining the image taken at ambient light conditions) better interpolation/extrapolation results can be obtained. Interpolation with more than one flash image allows for the compensation of saturation in some cases.

Although typically the continuous flash system and method corrects the intensity of the whole image, in one embodiment only a portion of the image is corrected to obtain the optimum or preferred intensity level. For instance, in this embodiment flash intensity can be increased only for the background of an image. In this embodiment the areas of the image for which flash intensity are sought to be varied are segmented out. These areas are then processed when varying the flash intensity with the system and method according to the invention. The areas that are not sought to be flash-adjusted are not processed.

The continuous flash system and method can be embodied in software and operated using a conventional computing device like a PC or laptop computer. However, one embodiment of the continuous flash system and method incorporates the process actions of the invention to vary the amount of flash intensity within the software or firmware of a digital camera. Processing of the images to obtain desired or optimum flash intensity in this embodiment is conducted within the camera.

The initial image set can be easily stored within a camera or other storage device and flash adjustment can be performed at a much later time after acquiring the initial image set. Because the images of the image set are so much alike, especially after alignment, compressing them together results in a representation that does not require much more space than storing just one image alone. For example, a mean image and differences images can be separately compressed, resulting in a very low storage cost. Compression can be performed by conventional means, such as, for example, Principal Component Analysis.

2.2 Interpolation/Extrapolation

As discussed above, the continuous flash system and method employs interpolation and extrapolation methods to provide a continuous spectrum of illumination levels from the originally acquired set of images of the desired subject matter. In mathematical terms, in one embodiment of the invention, this may be described as follows:

Let $I_0$ denote the image taken without flash, and $I_1$ denote the image taken with flash. A continuous family of images can be defined:

$I(\alpha)=(1-\alpha)I_0+(\alpha)I_1$, $\alpha \in R$ where R is the set of real numbers.

Thus, $\alpha$ represents the quantity of flash:

$I(0)=I_0$ is the original image taken without flash.
$I(1)=I_1$ is the original image taken with flash.
$I(\alpha)$ for $0<\alpha<1$ is an interpolated image where flash intensity is adjusted between the two acquired images.
$I(\alpha)$ for $\alpha>1$ is an extrapolated image that has more flash than taken with the original image with flash. $I(\alpha)$ for $\alpha<0$ is an extrapolated image that has less flash than possible (i.e. subtracts flash reflectance from an image already taken without flash).

The above discussed interpolation/extrapolation is performed on a pixel by pixel basis. The interpolation method discussed above employs basic linear interpolation in RGB color space. One could also interpolate in other color models, such as HSV (hue, saturation, value) or HLS (hue, lightness, saturation). Likewise other interpolation or extrapolation functions could be used, such as bilinear interpolation, spline-based interpolation, curve fitting, and regression. These other methods of interpolation/extrapolation are more useful when greater than one flash image is used.

For the multi-flash embodiment of the invention, let the images be denoted $I_0, I_1, \ldots, I_n$, where the flash intensity in image $I_i$ is $f_i$ (some continuous value). Thus, for the common two-image case, one simply has images $I_0, I_1$ with $f_0=0$ and $f_1=1$ (zero flash and full flash). One example of an image set with greater than two images would be a set of 3 images: $I_0, I_1, I_2$ with $f_0=0$, $f_1=0.5$, $f_2=1$. During the interpolation, each pixel is treated independently. That is, for a given pixel, it has a different color value in each of the images. These values can be denoted $c_0, c_1, \ldots c_n$. The result is thus a simple data fitting problem (e.g., curve fitting or regression). A function c(f) that fits the two-dimensional points (2D) $(f_0,c_0), (f_1,c_1), \ldots (f_n,c_n)$ is sought. One example of such a function is a piecewise linear curve that just connects the points. This piecewise linear curve then corresponds to linear interpolation between successive samples. Another example of a suitable curve for interpolation is a spline curve (a polynomial function that is fit to the 2D points). There are approximating spline curves (that do not pass through the points), and interpolating spline curves (that do pass through the points). One common example of an approximation spline curve is called a cubic B-spline. A common example of an interpolating spline curve is called a Catmull-Rom spline.

Once the function c(f) for the pixel has been constructed (e.g. via piecewise linear interpolation, or spline), it can then be evaluated at the desired flash intensity f.

2.3 Registration/Alignment

Since the two source images are not acquired at the exact same time, there may be motion of the camera from one image to the other. This motion can be compensated for by registering the two images together. This registration or alignment problem is well known in computer vision. The one big difference in the continuous flash system and method is that the images of the initially acquired image set have different intensity values, since one (or more) is taken with flash and another is taken without. In one working embodiment of the invention, conventional edge detection methods were used to identify the same objects in the image taken with flash and the image taken without flash, and these edges were then used to align the two images. However, other conventional image alignment and registration methods can also be used.

It is important, however, that the registration algorithm employed should be robust to intensity differences. One can apply a Gaussian or Laplacian filter to both images of a two-image set to locate high-derivative regions of the image, and align these derivative images together. For example, a Laplacian pyramid can be used to identify the high-frequency edges of an image. Thus, to align two images ($I_0$ and $I_1$) a Laplacian pyramid is constructed of each image of the image set. The images are then aligned by aligning the largest coefficients in the finest Laplacian pyramid images. This method is robust to intensity differences because the location of the largest coefficients in the finest pyramid does not change if the illumination level of the image changes. For additional robustness, the alignment cost metric could look at just the signs of the derivatives and ignore their magnitudes.

2.4 Exemplary Working Embodiment

The following paragraphs describe an exemplary working embodiment of the continuous flash system and method.

Figure 5A:
FIG. 5A is a first acquired image taken without flash and used as input to the system and method according to the invention.
Figure 5B:
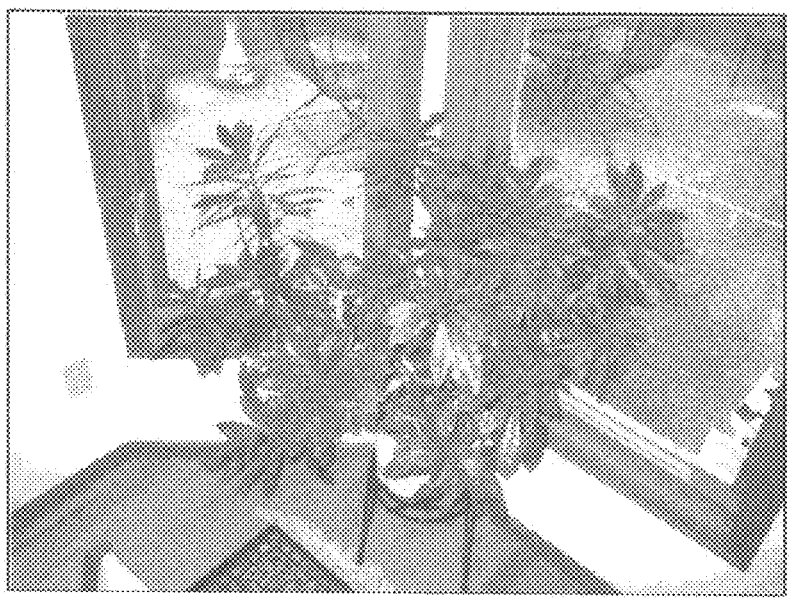
FIG. 5B is a second acquired image taken with flash and used as input to the system and method according to the invention.
Figure 6A:
FIG. 6A is a first extrapolated image of one working embodiment of the invention with the flash intensity set to I=−1.
Figure 6B:
FIG. 6B is a second interpolated image of one working embodiment of the invention with the flash intensity set to I=0.3.
Figure 6C:
FIG. 6C is a third interpolated image of one working embodiment of the invention with the flash intensity set to I=0.5.
Figure 6D:
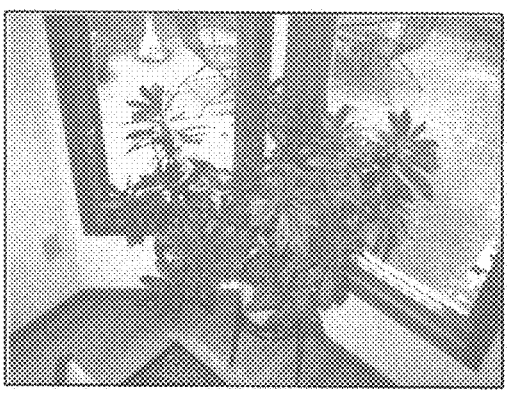
FIG. 6D is a fourth interpolated image of one working embodiment of the invention with the flash intensity set to I=0.7.
Figure 6E:
FIG. 6E is a fifth extrapolated image of one working embodiment of the invention with the flash intensity set to I=1.4.
Figure 6F:
FIG. 6F is a sixth extrapolated image of one working embodiment of the invention with the flash intensity set to I=2.0.

As shown in FIGS. 5A and 5B, a set of two images were acquired to be used as an input to the system and method according to the invention. FIG. 5A represents an image taken without flash, with only ambient lighting. FIG. 5B represents a second image taken of the same subject matter taken in FIG. 5A, but taken with a flash. The scene was still and a camera tripod was used to photograph this original set of images, and therefore no alignment was required in order to correct for any misalignment. FIG. 6A is an extrapolated image with the flash intensity set to I=−1. FIGS. 6B, 6C and 6D are interpolated images with the flash intensities set to I=0.3, I=0.5, and I=0.7, respectively. FIG. 6E is a fifth extrapolated image with the flash intensity set to I=1.4. Likewise, FIG. 6F is a sixth extrapolated image with the flash intensity set to I=2.0.

2.4.1 Interpolation Function

The interpolation computation performed in this working embodiment employed the formula $$I(\alpha) = (1-\alpha)I_0 + (\alpha)I_1.$$

The images shown in the above example were computed using simple linear interpolation in RGB space.

2.4.2 Exposure Settings

In the above example, the source images were captured with automatic exposure settings by the digital camera. It would be preferable for the two source images to be taken with identical exposure settings. Or, at least it would be preferable to know the F-stop difference between the two exposures, so that image values from both exposures can be brought into a common luminance coordinate system prior to interpolation or extrapolation.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore, what is claimed is:

1. A process for adjusting the amount of flash in an image, comprising the process actions of: acquiring an image set comprising a first image of a given subject matter without flash and more than two additional images of the same subject matter as the first image with varying amounts of flash; interpolating between the images of the image set for all pixels of each of the images, using images of the image set, to provide one or more images with an amount of flash between the images of the image set, using a general purpose computing device.

2. The process of claim 1 wherein there is camera motion between the acquiring of the first and additional images;
   and wherein there is misalignment of the subject matter in the first and additional images;
   and wherein the subject matter of the first and additional images is aligned.

3. The process of claim 2 wherein the subject matter of the first and additional images is aligned by detecting the edges of the subject matter in the first and additional images and the images are aligned by aligning said edges.

4. The process of claim 1 wherein there is motion of the subject matter between the acquiring of the first and additional images;
   and wherein there is misalignment of the subject matter in the first and additional images;
   and wherein the subject matter of the first and additional images is aligned.

5. The process of claim 4 wherein the subject matter of the first and additional images is aligned by detecting the edges of the subject matter in the first and additional images and the images are aligned by aligning said edges.

6. The process of claim 1 wherein the interpolating process action comprises using at least one of the following interpolation techniques:
   linear interpolation;
   bilinear interpolation;
   spline-based interpolation;
   curve fitting;
   and regression.

7. The process of claim 1 wherein the interpolating process action comprises interpolating in one of the following color spaces:
   red, green, blue (RGB);
   hue, saturation, value (HSV);
   hue, lightness, saturation (HLS);
   luminance, chrominance (YUV);
   luminance, chrominance (YIQ); and
   grayscale.

8. The process of claim 1 further comprising the process action of allowing a user to select a final image with a preferred level of flash intensity from said one or more images with an amount of flash between the first and additional images.

9. The process of claim 1 further wherein the user selects at least one final image with a preferred level of flash intensity from said one or more images with an amount of flash between the first and additional images after varying the flash level of said one or more images with an amount of flash between the first and additional images using a slider control.

10. The process of claim 1 further wherein the user selects at least one final image with a preferred level of flash intensity from said one or more images with an amount of flash between the first and additional images after varying the flash level of said one or more images with an amount of flash between the first and additional images using one or more of three slider controls that vary the red, blue and green component flash intensity separately.

11. The process of claim 1 further comprising the process action of the automatically selecting at least one final image with a preferred level of flash intensity from said one or more images with an amount of flash between the first and additional images based on a predetermined flash intensity value.

12. The process of claim 1 further comprising the process action of automatically selecting at least one final image with a preferred level of flash intensity from said one or more images with an amount of flash between the first and additional images based on an optimal flash intensity value that incorporates an output of a machine-learning algorithm which has been trained on sets of images which serve as examples of good and bad levels of flash.

13. The process of claim 1 wherein the interpolating process action is only applied to a portion of said images of the image set to provide a portion of said one or more images with an amount of flash between the images of the image set.

14. The process of claim 13 wherein the interpolating process action is only applied to a portion of said images of the image set by the following process actions:
   segmenting out the portion of the images of the image set to which the interpolating process action is to be applied; and
   applying the interpolating process action to only said segmented out portion of said images of the image set.

15. A system for adjusting the flash level in an image, the system comprising:
   a general purpose computing device; and
   a computer program comprising program modules executable by the computing device, wherein the computing device is directed by the program modules of the computer program to,
   acquire an image set comprising a first image of a given subject matter without flash and more than two images of the same subject matter as the first image with flash;
   extrapolate beyond the images of the image set for each and every pixel to provide one or more images, using images of the image set, wherein each pixel of said one or more images has an amount of flash greater than the flash level or less than the flash level of the images of the image set.

16. The system of claim 15 wherein there is motion between the acquiring images of the image set;
and wherein there is misalignment of the subject matter in the images of the image set;
and wherein the subject matter of the image set is aligned.

17. The system of claim 15 wherein the extrapolating module comprises using at least one of the following extrapolation techniques:
linear extrapolation;
bilinear extrapolation;
spline-based extrapolation; and
curve fitting.

18. The system of claim 15 wherein the extrapolating module comprises extrapolating in one of the following color spaces:
red, green, blue (RGB);
hue, saturation, value (HSV);
hue, lightness, saturation (HLS);
luminance, chrominance (YUV);
luminance, chrominance (YIQ); and
grayscale.

19. The system of claim 15 further comprising a module to allow a user to select at least one final image with a preferred level of flash intensity from said images of the image set with an amount of flash greater than or less than that of the images of the image set.

20. The system of claim 15 further comprising a module to automatically select at least one final image with a preferred level of flash intensity from said one or more images with an amount of flash greater than or less than the images of the image set based on a predetermined flash intensity value.

21. The system of claim 15 further comprising a module to automatically select at least one final image with a preferred level of flash intensity from said one or more images with an amount of flash greater than or less than the images of the image set based an optimal flash intensity value that incorporates an output of a machine-learning algorithm which has been trained on sets of images which serve as examples of good and bad levels of flash.

22. The system of claim 15 wherein the extrapolating module is only applied to a portion of said images of the image set to provide a portion of said one or more images with a flash intensity greater than or less than the images of the image set.

23. A computer storage medium having computer-executable instructions for adjusting the flash level of an image said computer executable instructions comprising modules for: acquiring an image set comprising a first image of a given subject matter without flash and more than two additional images of the same subject matter as the first image with a varying amount of flash; and interpolating between the images of the image set for all pixels of each of the images, using images of the image set, to provide one or more images with an amount of flash between the images of the image set.

24. The computer storage medium of claim 23 wherein there is camera motion between the acquiring of the images of the image set causing misalignment of the subject matter in the images of the image set; and further comprising a module for aligning the subject matter of the images in the image set.

25. The computer storage medium of claim 23 wherein there is motion of the subject matter between the acquiring of images of the image set causing misalignment of the subject matter in the image set; and further comprising a module for aligning the subject matter of the images of the image set.

26. The computer storage medium of claim 23 wherein the module for interpolating comprises using at least one of the following interpolation techniques: linear interpolation; bilinear interpolation; spline-based interpolation; curve fitting; and regression.

27. The computer storage medium of claim 23 wherein the interpolating module comprises interpolating in one of the following color spaces: red, green, blue (RGB); hue, saturation, value (HSV); hue, lightness, saturation (HLS); luminance, chrominance (YUV); luminance, chrominance (YIQ); and grayscale.

28. The computer storage medium of claim 23 further comprising a module for allowing a user to select at least one final image with a preferred level of flash intensity from said images one or more images with an amount of flash between the images of the image set.

29. The computer storage medium of claim 23 wherein the module for interpolating is only applied to a portion of said images of said image set to provide a portion of said one or more images with an amount of flash between the images of the image set.

30. The computer storage medium of claim 23 wherein said computer-executable instructions are executed in a camera.

31. A computer storage medium having computer-executable instructions for adjusting the flash level of an image, said computer executable instructions comprising modules for: acquiring an image set comprising a first image of a given subject matter without flash and at least two additional image of the same subject matter as the first image with flash with varying amounts of flash; and extrapolating beyond the images of the image set, using the images of the image set, to provide one or more images comprising pixels each with an amount of flash greater than or less than the images of the image set.

32. The computer storage medium of claim 31 wherein there is camera motion between the acquiring of the images of the image set causing a misalignment of the subject matter in the images of the image set; and further comprising a program module for aligning the subject matter of the images in the image set.

33. The computer storage medium of claim 31 wherein the program module for aligning the subject matter of the images in the image set comprises sub-modules for: constructing a Laplacian pyramid for each image of said image set, each Laplacian pyramid having a set of coefficients; aligning said images of said image set by aligning the largest coefficients of the set of Laplacian pyramids corresponding to each image in said image set.

34. The computer storage medium of claim 32 wherein there is motion of the subject matter between the acquiring of images of the image set causing a misalignment of the subject matter between the images of the image set; and further comprising a module for aligning the subject matter of the images of the image set.

35. The computer storage medium of claim 32 wherein the extrapolating module comprises using at least one of the following extrapolation techniques: linear extrapolation; bilinear extrapolation; spline-based extrapolation; and curve fitting.

36. The computer storage medium of claim 32 wherein the extrapolating module comprises extrapolating in one of the following color spaces: red, green, blue (RGB); hue, saturation, value (HSV); hue, lightness, saturation (HLS); luminance, chrominance (YUV); luminance, chrominance (YIQ); and grayscale.

37. The computer storage medium of claim 32 further comprising a module for allowing a user to select at least one final image with a preferred level of flash intensity from said images one or more images with an amount of flash greater than or less than the images of the image set.

38. The computer storage medium of claim 32 wherein the module for extrapolating are only applied to a portion of said images of said image set to provide a portion of said one or more images with an amount of flash between the images of the image set or with an amount of flash greater than or less than the images of the image set.

39. The computer storage medium of claim 32 wherein said computer-executable instructions are executed in a camera.

40. A camera for adjusting the flash level in an image, the camera comprising:
   a computing device; and
   a computer program comprising program modules executable by the computing device, wherein the computing device is directed by the program modules of the computer program to,
      acquire an image set comprising a first image of a given subject matter without flash and more than two additional images of the same subject matter as the first image with flash; and
      interpolate between the images of the image set for all pixels of each of the images, using images of the image set, to provide one or more images with an amount of flash between the images of the image set; and
      extrapolate beyond the images of the image set for all pixels of each of the images, using images of the image set, to provide one or more images with an amount of flash greater than or less than the images of the image set.

41. The camera of claim 40 further comprising a module of a computer program to print one or more images provided with an amount of flash between the images of the image set or with an amount of flash greater than or less than the images of the image set.

42. The camera of claim 40 further comprising a module of a computer program to display one or more images provided with an amount of flash between the images of the image set or with an amount of flash greater than or less than the images of the image set.

43. The camera of claim 40 further comprising a module of a computer program to store one or more images provided with an amount of flash between the images of the image set or with an amount of flash greater than or less than the images of the image set.

44. The camera of claim 40 wherein the acquired image set is stored within the camera after acquisition.

45. The camera of claim 44 wherein the acquired image set is compressed for storage within the camera.

46. A camera for adjusting the flash level in an image, the camera comprising:
   a computing device; and
   a computer program comprising program modules executable by the computing device, wherein the computing device is directed by the program modules of the computer program to,
      acquire an image set comprising a first image of a given subject matter without flash and more than two additional images of the same subject matter as the first image with varying degrees of flash; and
      interpolate between the images of the image set for all pixels of each of the images, using the images of the image set, to provide one or more images with an amount of flash between the images of the image set.

47. The camera of claim 46 further comprising a module of a computer program to print one or more images provided with an amount of flash between the images of the image set.

48. The camera of claim 47 further comprising a module of a computer program to display one or more images provided with an amount of flash between the images of the image set.

49. The camera of claim 46 further comprising a module of a computer program to store one or more images provided with an amount of flash between the images of the image set.

50. A camera for adjusting the flash level in an image, the camera comprising:
   a computing device; and
   a computer program comprising program modules executable by the computing device, wherein the computing device is directed by the program modules of the computer program to,
      acquire an image set comprising a first image of a given subject matter without flash and more than two additional images of the same subject matter as the first image with flash; and
      extrapolate beyond the images of the image set, using images of the image set, to provide one or more images with an amount of flash greater than or less than the images of the image set.

* * * * *